(12) United States Patent
Sun et al.

(10) Patent No.: US 12,498,469 B2
(45) Date of Patent: Dec. 16, 2025

(54) CLOUD BASED SCANNING FOR DETECTION OF SENSORS MALFUNCTION FOR AUTONOMOUS VEHICLES

(71) Applicants: Baidu USA LLC, Sunnyvale, CA (US); APOLLO INTELLIGENT DRIVING TECHNOLOGY (BEIJING) CO., LTD., Beijing (CN)

(72) Inventors: Tianjia Sun, Sunnyvale, CA (US); Weiliang Sun, Beijing (CN); Yaoming Shen, Sunnyvale, CA (US); Shuli Yin, Beijing (CN); Baoping Yuan, Sunnyvale, CA (US)

(73) Assignees: BAIDU USA LLC, Sunnyvale, CA (US); APOLLO INTELLIGENT DRIVING TECHNOLOGY (BEIJING) CO., LTD., Beijing (CN)

( * ) Notice: Subject to any disclaimer, the term of this patent is extended or adjusted under 35 U.S.C. 154(b) by 225 days.

(21) Appl. No.: 18/000,310

(22) PCT Filed: Sep. 27, 2022

(86) PCT No.: PCT/CN2022/121713
§ 371 (c)(1),
(2) Date: Nov. 30, 2022

(87) PCT Pub. No.: WO2024/065173
PCT Pub. Date: Apr. 4, 2024

(65) Prior Publication Data
US 2024/0353545 A1 Oct. 24, 2024

(51) Int. Cl.
*G01S 7/497* (2006.01)
*B60W 60/00* (2020.01)
*G01S 17/931* (2020.01)

(52) U.S. Cl.
CPC .......... *G01S 7/497* (2013.01); *B60W 60/001* (2020.02); *G01S 17/931* (2020.01); *B60W 2420/408* (2024.01); *B60W 2556/45* (2020.02)

(58) Field of Classification Search
CPC .......... B60W 60/001; B60W 2556/45; B60W 2420/408
See application file for complete search history.

(56) References Cited

U.S. PATENT DOCUMENTS

2019/0061775 A1* 2/2019 Emura .............. G01S 7/497
2022/0268904 A1* 8/2022 Zhao .................. G01S 7/40

* cited by examiner

*Primary Examiner* — Huan Le
(74) *Attorney, Agent, or Firm* — WOMBLE BOND DICKINSON (US) LLP (57) ABSTRACT

In one embodiment, a system obtains first point cloud data generated by a first scanner device of a first autonomous driving vehicle (ADV). The system applies one or more abnormality detection algorithms to the first point cloud data to determine an abnormality in the first point cloud data. The system determines an abnormality type for the abnormality. The system determines the abnormality is above a severity threshold based on the abnormality type. In response to determining that the abnormality is above the severity threshold, the system indicates a warning to inspect the first scanner device for any hardware malfunctions.

20 Claims, 9 Drawing Sheets

| LIDAR | ADV | August 8, 2022 | August 9, 2022 | August 10, 2022 |
|---|---|---|---|---|
| 601A | 101A | ←603 | | ←603 |
| 601B | 101B | ←605 | ←604 | ←611 |
| 601C | 101C | | | |
| 601D | 101D | ←607 | | |
| 601E | 101E | | | ←611 |
| 601F | 101F | | | ←611 |
| 601G | 101G | | | ←611 |
| 601H | 101H | | | |
| 601I | 101I | | | ←611 |
| 601J | 101J | ←609 | | |
| 601K | 101K | | | |

CLOUD BASED SCANNING FOR DETECTION OF SENSORS MALFUNCTION FOR AUTONOMOUS VEHICLES

CROSS-REFERENCE TO RELATED APPLICATION

This application is a National Stage of International Application No. PCT/CN2022/121713, filed Sep. 27, 2022, which is hereby incorporated by reference in its entirety.

TECHNICAL FIELD

Embodiments of the present disclosure relate generally to operating autonomous driving vehicles. More particularly, embodiments of the disclosure relate to cloud-based and local scanning for detection of sensors malfunction for autonomous driving vehicles (ADVs).

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Onboard light and ranging (LIDAR) devices/sensors are critical component for autonomous driving. Failures of LIDAR devices can cause potential accidents on the road and identification of early indications of failures can prevent potential accidents caused by the failures.

BRIEF DESCRIPTION OF THE DRAWINGS

Embodiments of the disclosure are illustrated by way of example and not limitation in the figures of the accompanying drawings in which like references indicate similar elements.

FIG. $8_{[csptall]}$ is a flow diagram illustrating an example of a method to detect point cloud data abnormalities according to one embodiment.

DETAILED DESCRIPTION

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to some embodiments, cloud server resources are utilized to process raw sensor data for abnormalities. The abnormalities can be profiled over a timeline for device failure detections. Embodiments leverage the scalability of computation resources of the cloud to process the raw sensor data. In some embodiment, the raw sensor data are profiled locally at the autonomous driving vehicle (ADV) and the profiling results are streamed to the cloud server. The profiling results allow an operate to visualize abnormalities over time and determine severity of the abnormalities according to different types of the abnormalities. In some embodiments, the cloud server automatically identifies an abnormality is above a severity threshold and indicates a warning signal to an operator of the ADV.

Early failure detection is feasible for LIDAR devices because LIDAR devices malfunction gradually. For example, a LIDAR device may initially miss a small angle of scanning data sporadically. Days or weeks later, the LIDAR device begins to miss larger angles more frequently.

Current state of the art systems deploys hardware failure detection mechanisms at the vehicles for real-time detection. The advantage of real-time detection is that hardware failure detection is performed immediately. The disadvantage is that the failure detection mechanisms share the power consumption and processing resources with the autonomous driving system of the vehicle. Further, due to the limitation of the processing resources, in-vehicle detection algorithms may be limiting and may not cover various types of abnormalities.

According to an embodiment, a system obtains first point cloud data generated by a first scanner device of a first autonomous driving vehicle (ADV). The system applies one or more abnormality detection algorithms to the first point cloud data to determine an abnormality in the first point cloud data. The system determines an abnormality type for the abnormality. The system determines the abnormality is above a severity threshold based on the abnormality type. In response to determining that the abnormality is above the severity threshold, the system indicates a warning to inspect the first scanner device for any hardware malfunctions.

Figure 1:
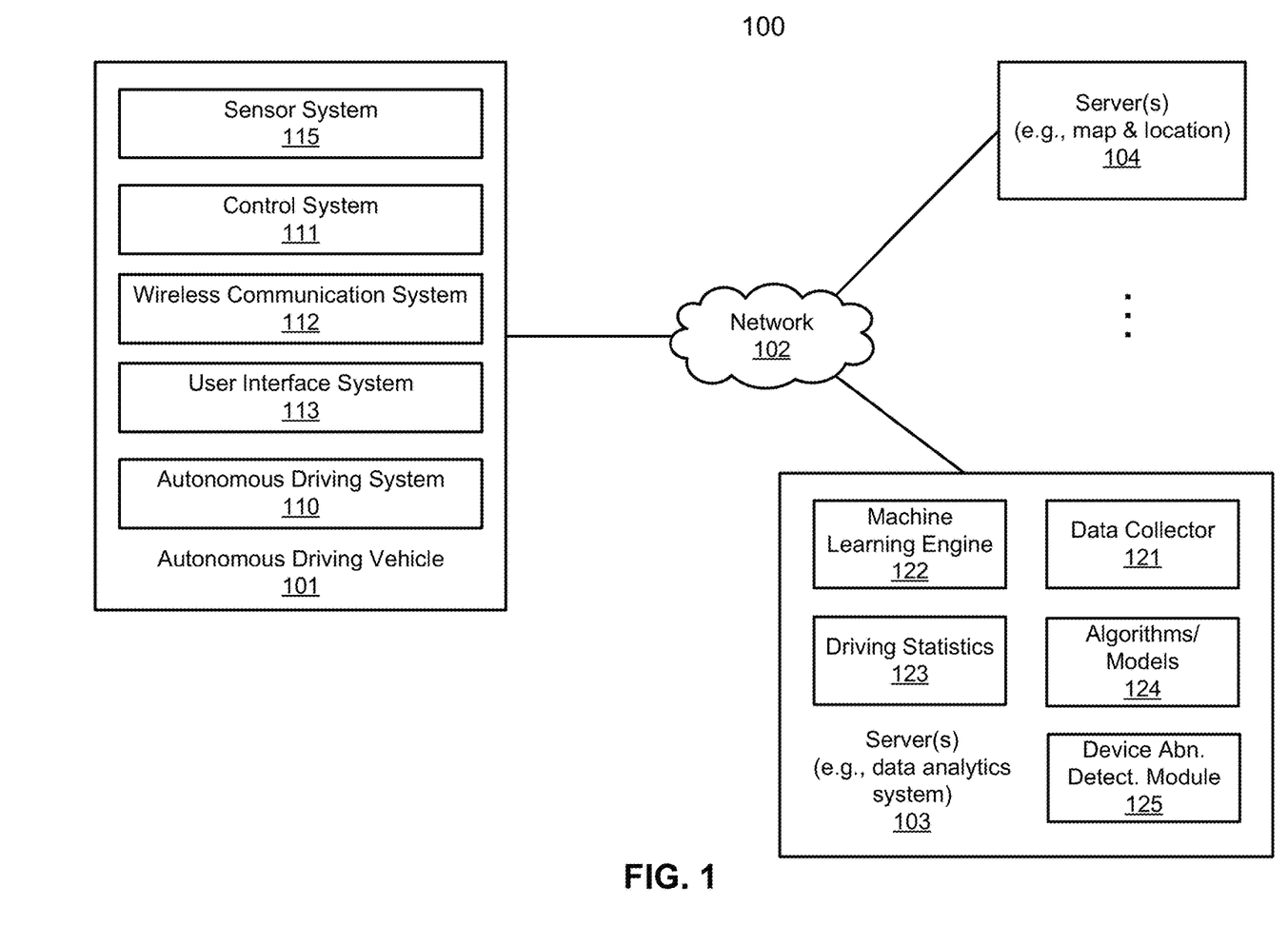
FIG. 1 is a block diagram illustrating a networked system according to one embodiment.

FIG. 1 is a block diagram illustrating an autonomous driving network configuration according to one embodiment of the disclosure. Referring to FIG. 1, network configuration 100 includes autonomous driving vehicle (ADV) 101 that may be communicatively coupled to one or more servers 103-104 over a network 102. Although there is one ADV shown, multiple ADVs can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An ADV refers to a vehicle that can be configured to in an autonomous mode in which the vehicle navigates through an environment with little or no input from a driver. Such an ADV can include a sensor system having one or more sensors that are configured to detect information about the environment in which the vehicle operates. The vehicle and its associated controller(s) use the detected information to navigate through the environment. ADV 101 can operate in a manual mode, a full autonomous mode, or a partial autonomous mode.

In one embodiment, ADV 101 includes, but is not limited to, autonomous driving system (ADS) 110, vehicle control system 111, wireless communication system 112, user interface system 113, and sensor system 115. ADV 101 may further include certain common components included in ordinary vehicles, such as, an engine, wheels, steering wheel, transmission, etc., which may be controlled by vehicle control system 111 and/or ADS 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
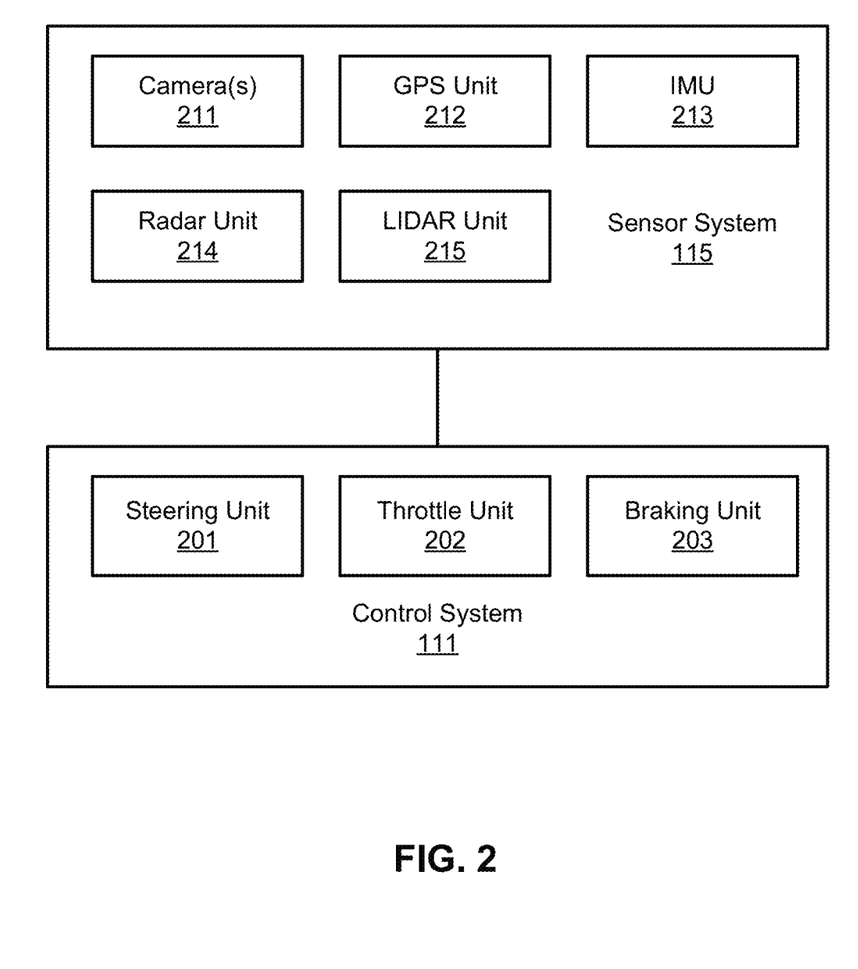
FIG. 2 is a block diagram illustrating an example of an autonomous driving vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the ADV. IMU unit 213 may sense position and orientation changes of the ADV based on inertial acceleration. Radar unit 214 may represent a system that utilizes radio signals to sense objects within the local environment of the ADV. In some embodiments, in addition to sensing objects, radar unit 214 may additionally sense the speed and/or heading of the objects. LIDAR unit 215 may sense objects in the environment in which the ADV is located using lasers. LIDAR unit 215 could include one or more laser sources, a laser scanner, and one or more detectors, among other system components. Cameras 211 may include one or more devices to capture images of the environment surrounding the ADV. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the ADV. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn controls the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between ADV 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of ADV 101 may be controlled or managed by ADS 110, especially when operating in an autonomous driving mode. ADS 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, ADS 110 may be integrated with vehicle control system 111.

For example, a user as a passenger may specify a starting location and a destination of a trip, for example, via a user interface. ADS 110 obtains the trip related data. For example, ADS 110 may obtain location and route data from an MPOI server, which may be a part of servers 103-104. The location server provides location services and the MPOI server provides map services and the POIs of certain locations. Alternatively, such location and MPOI information may be cached locally in a persistent storage device of ADS 110.

While ADV 101 is moving along the route, ADS 110 may also obtain real-time traffic information from a traffic information system or server (TIS). Note that servers 103-104 may be operated by a third party entity. Alternatively, the functionalities of servers 103-104 may be integrated with ADS 110. Based on the real-time traffic information, MPOI information, and location information, as well as real-time local environment data detected or sensed by sensor system 115 (e.g., obstacles, objects, nearby vehicles), ADS 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either ADVs or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. In one embodiment, algorithms/models 124 may include scanning algorithms or machine learning models to detect various types of LIDAR data abnormalities. In one embodiment, models/algorithms 124 is utilized by device abnormality detection module 125 to process raw LIDAR data. in one embodiment, algorithms 124 includes configurations of severity thresholds for each types of LIDAR data abnormalities that would alert an operator.

In one embodiment, algorithms/models 124 can be streamed to ADVs to perform the abnormality detection in real-time. In one embodiment, models/algorithms 124 is utilized by device abnormality detection module 308 of ADV 101 to process raw LIDAR data. Device abnormality detection module 125 or 308 is further detailed in FIG. 4.

Figure 3A:
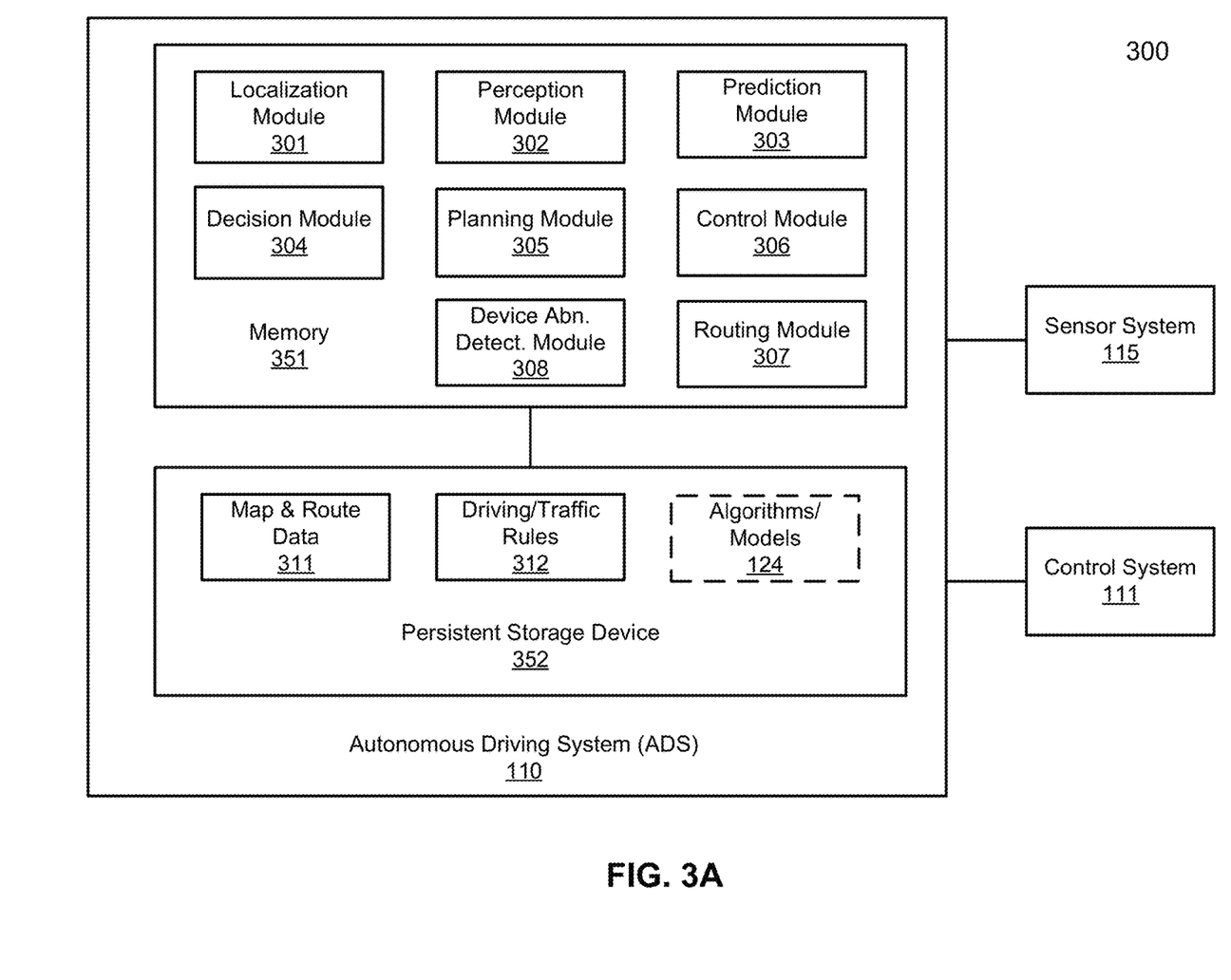
FIGS. 3A-3B are block diagrams illustrating an example of an autonomous driving system used with an autonomous driving vehicle according to one embodiment.
Figure 3B:
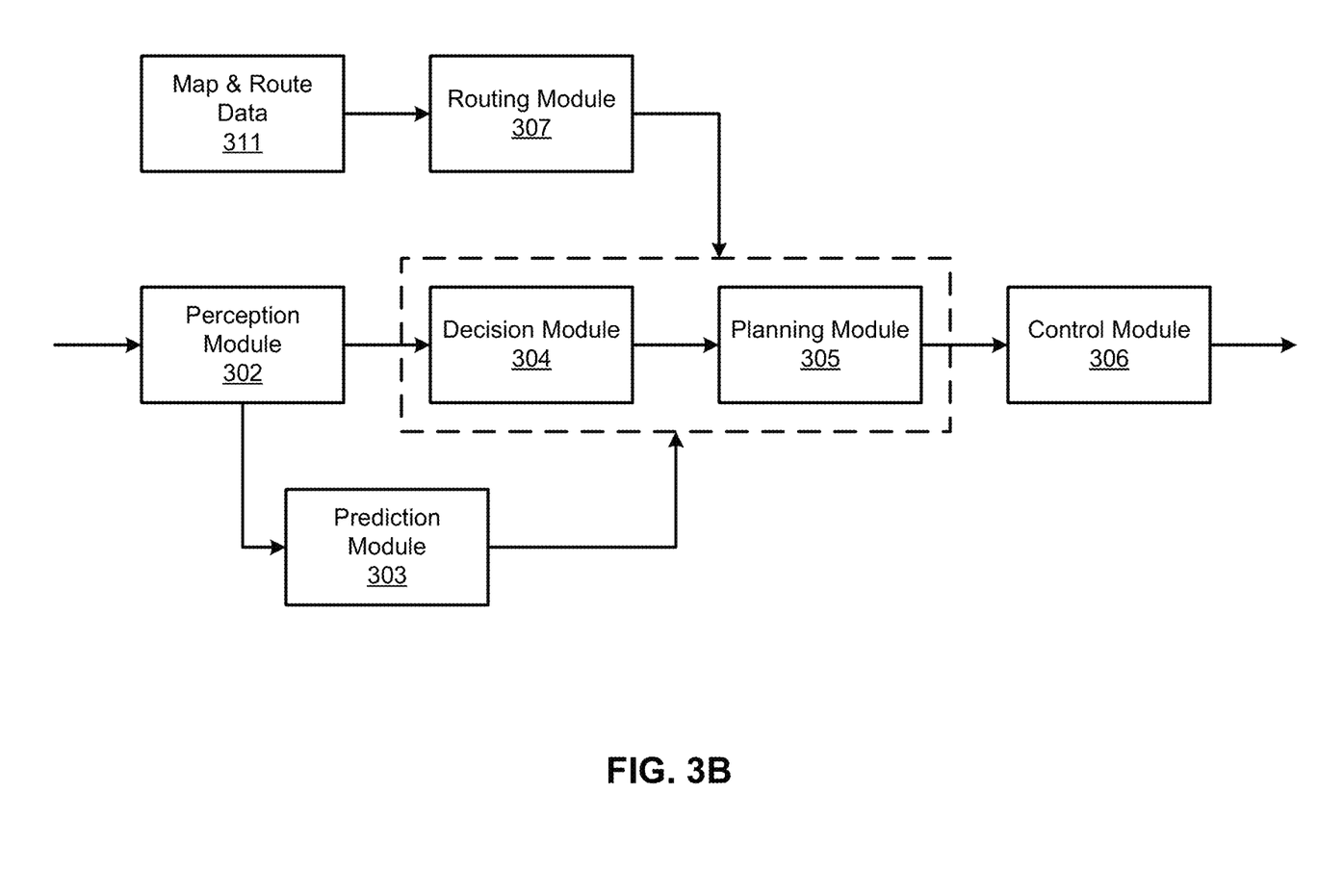

FIGS. 3A and 3B are block diagrams illustrating an example of an autonomous driving system used with an ADV according to one embodiment. System 300 may be implemented as a part of ADV 101 of FIG. 1 including, but is not limited to, ADS 110, control system 111, and sensor system 115. Referring to FIGS. 3A-3B, ADS 110 includes, but is not limited to, localization module 301, perception module 302, prediction module 303, decision module 304, planning module 305, control module 306, routing module 307, and device abnormality detection module 308.

Some or all of modules 301-308 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-308 may be integrated together as an integrated module.

Localization module 301 determines a current location of ADV 101 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of ADV 101, such as map and route data 311, to obtain the trip related data. For example, localization module 301 may obtain location and route data from a location server and a map and POI (MPOI) server. A location server provides location services and an MPOI server provides map services and the POIs of certain locations, which may be cached as part of map and route data 311. While ADV 101 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of the ADV. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/route information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the ADV, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 101 would move in a next moving cycle (e.g., next route/path segment). For example, the planning and control data may instruct vehicle 101 to move 10 meters at a speed of 30 miles per hour (mph), then change to a right lane at the speed of 25 mph.

Based on the planning and control data, control module 306 controls and drives the ADV, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the ADV. For example, the navigation system may determine a series of speeds and directional headings to affect movement of the ADV along a path that substantially avoids perceived obstacles while generally advancing the ADV along a roadway-based path leading to an ultimate destination. The destination may be set according to user inputs via user interface system 113. The navigation system may update the driving path dynamically while the ADV is in operation. The navigation system can incorporate data from a GPS system and one or more maps so as to determine the driving path for the ADV.

Device abnormality detection module 308 can process raw LIDAR data for abnormalities to obtain a profile of the raw LIDAR data. In some embodiment, the raw LIDAR data are processed when processing resources of ADV 101 is idle, or when ADV is parked or stationary. Once processed, the profile or profiling results can be uploaded to server 103 for further analysis.

Figure 4:
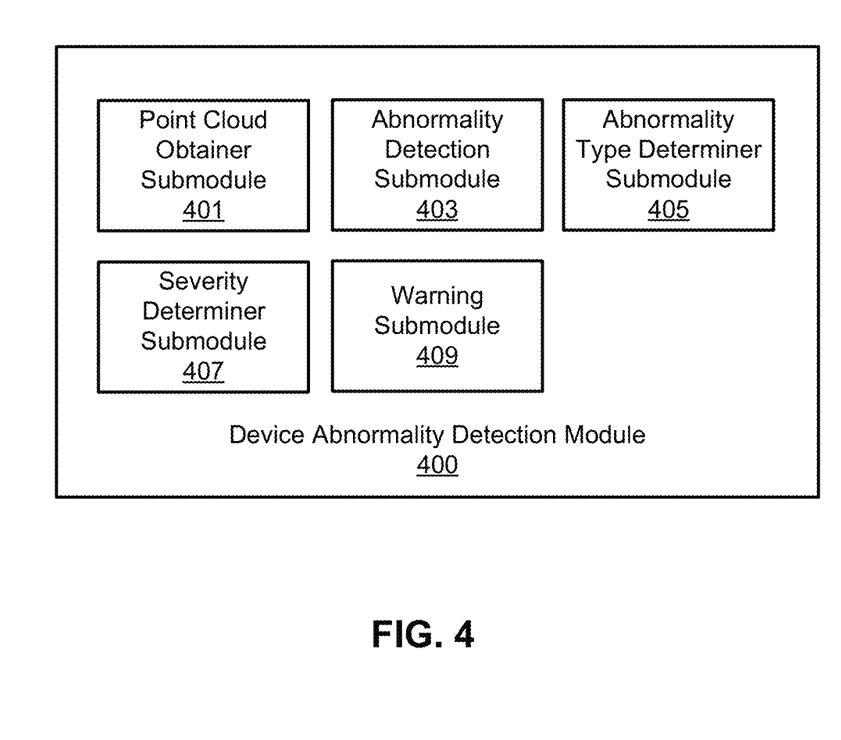
FIG. 4 is a block diagram illustrating an example of a device abnormality detection module according to one embodiment.

FIG. 4 is a block diagram illustrating an example of a device abnormality detection module according to one embodiment. Device abnormality detection module 400 can represent device abnormality detection module 125 of FIG. 1 or device abnormality detection module 308 of FIG. 3A. Device abnormality detection module 400 can detect abnormalities in raw LIDAR point cloud data and profile the abnormalities over a timeline. In one embodiment, device abnormality detection module 400 includes point cloud obtainer submodule 401, abnormality detection submodule 403, abnormality type determiner submodule 405, severity determiner submodule 407, and warning submodule 409. Point cloud obtainer submodule 401 can obtain raw point cloud data from a LIDAR device. The point cloud data can include one or more frames of points in a three-dimensional (3D) space. The 3D points can represent distances to obstacles, which are detected by incident light signals that are reflected back to a light detecting sensor of the LIDAR device with some delays. In one embodiment, point cloud data captures 360 degrees of the environment surrounding an ADV (rotating LIDAR). In one embodiment, the point cloud captures a 60-180 degree of view at the front, back, or to a side of the ADV (flash LIDAR). Abnormality detection submodule 403 can apply scanning algorithms to the point cloud data and detect abnormalities in the data. Abnormality type determiner submodule 405 can categorize the detected abnormalities to a particular type. Some examples of abnormality types include noisy point cloud, point cloud that is missing a small (e.g., smaller than 10 degrees in angle) portion of data, point cloud that is missing a large portion of data (e.g., larger than 90 degrees in angle), discontinuous scan lines, etc. Severity determiner submodule 407 can evaluate a severity of an abnormality. The severity can be evaluated via a severity threshold for each type of abnormality. Warning submodule 409 can indicate a warning signal if the severity of the abnormality is above the threshold. Note that some of modules 401-409 may be integrated together as an integrated module.

Figure 5:
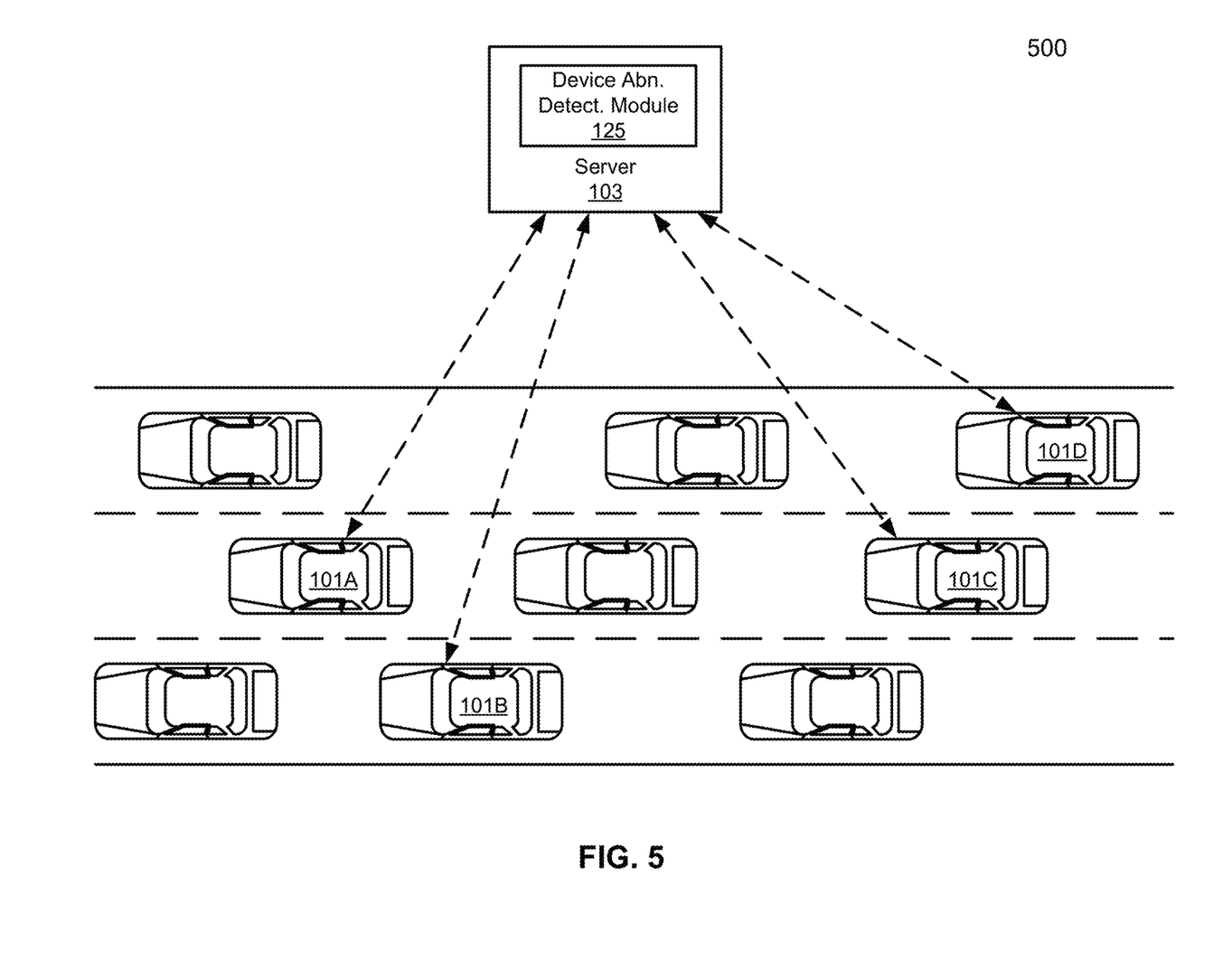
FIG. 5 is a block diagram illustrating a network of autonomous driving vehicles according to one embodiment.

FIG. 5 is a block diagram illustrating a network 500 of autonomous driving vehicles (ADVs) 101A-101D according to one embodiment. As shown in FIG. 5, in one embodiment, ADVs 101A-101D can upload raw LIDAR data to server 103 for processing. The raw LIDAR data can be uploaded from ADVs 101A-101D to server 103 via a WIFI network, a cellular network, or manually by an operator via hot-pluggable removable hard drives. In one embodiment, the upload can be scheduled to be performed periodically, e.g., daily, hourly, etc. In one embodiment, the raw LIDAR data can be applied a scanning algorithm by a respective ADV and the processing results are uploaded periodically to server 103.

When raw LIDAR data are uploaded to server 103s, server 103 can apply one or more algorithms to the LIDAR data to identify abnormalities in the LIDAR data and further categorizes the abnormalities into one or more types of abnormalities. Example types of abnormalities include missing data in a small section (e.g., less than 10 degrees, or less than ⅛ of data missing in the frame), missing data in a large section (e.g., greater than 10 degrees, or greater than ⅛ of data missing in the frame), noisy data, missing ground information, discontinuous scan lines, etc. In some embodiments, the algorithms can correspond to machine learning models that are trained to detect different types of abnormalities. Machine learning models can include trainable deep learning convolutional neural network models, recurrent neural network models, long-short term memory, gated recurrent units, etc. The models can be supervised to learn to 1) identify abnormalities and/or 2) to categorize an abnormality into a particular type from a list of abnormality types. In one embodiment, the scanning algorithms can include pattern recognition algorithms configured to recognition patterns identifiable for each type of abnormalities. When the raw LIDAR data are scanned for abnormalities, the raw LIDAR data can be profiled over a time period with status indications (further detailed in FIG. 6) corresponding to each data frame in the time period. Once profiled, server 103 can process the profiles for early warning signals and/or an operator can view the profiles in a timeline via an interface as shown in FIG. 6.

Figure 6:
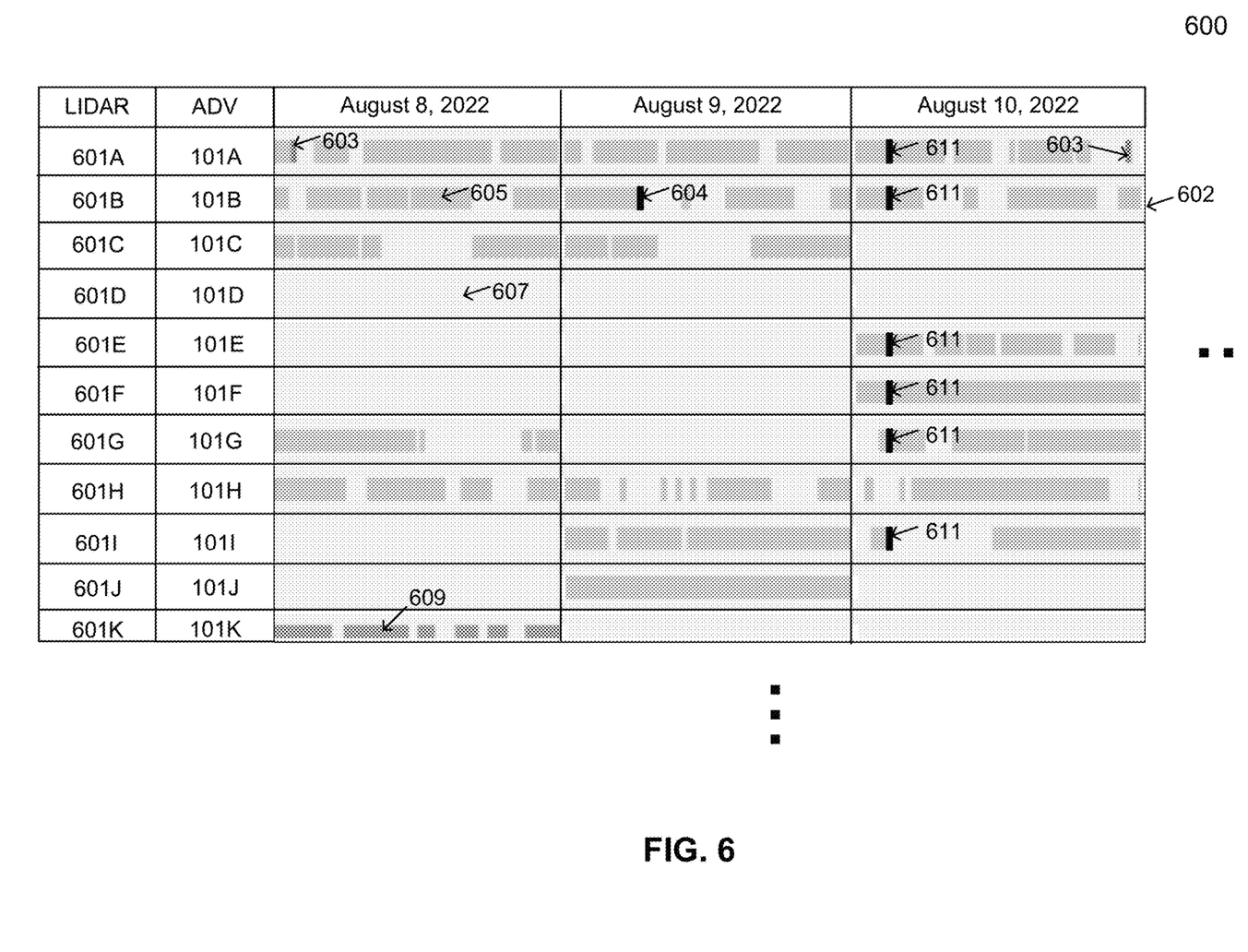
FIG. 6 is a block diagram illustrating an example interface of abnormality profiles according to one embodiment.

FIG. 6 is a block diagram illustrating examples of an interface 600 of abnormality profiles 602 according to one embodiment. The abnormality profiles (or profiles) can describe the health of captured raw LIDAR data over a period of time. Profiles 602 can be plotted in interface 600, where each row can represent status indications of a LIDAR device and each column represents status indications over a day's time. For example, interface 600 includes status indications for raw LIDAR data of LIDAR devices 601A-601K over a three day period. The status can be indicated by a plurality of indication bars of different colors/shades over the time period. Examples of the status indication bars can be: processed+normal 605, processed+abnormal (and their types) 603-604, unprocessed 609, or not available 607. Processed+normal indicator 605 can correspond to a raw LIDAR data frame that is scanned by abnormality algorithms and no abnormalities are found. Processed+abnormal indicators 603-604 can correspond to a raw LIDAR data frame that is scanned by abnormality algorithms, where at least one abnormality is found. Indicator 603 can correspond to a type 1 abnormality (e.g., missing a small section of data) and indicator 604 can correspond to type 2 abnormality (e.g., noisy data). Unprocessed indicator 609 can indicate raw LIDAR data frames that are not yet processed by any abnormality algorithms. Not available indicator 607 can indicate no raw LIDAR data are available for processing during that time period.

In one embodiment, server 103 (one or more cloud server nodes) can determine an abnormality type for each detected abnormality. Server can then determine a severity threshold associated with the detected abnormality according to the determined abnormality type. In one embodiment, the severity threshold for a small section of missing LIDAR data to be considered severe when two or more indications occurred within a span of three days. In one embodiment, the severity threshold for a large section of missing LIDAR data is the occurrence of one indication. If the severity is above the threshold, server 103 can signal an early warning to warn an operator, or server 103 can send a signal to the ADV to warn an operator of the ADV to inspect the LIDAR device for malfunctions. In one embodiment, if an abnormality is observed across two or more ADVs over a same time period and then disappears, server 103 may identify the abnormality to be systematic (e.g., weather related) and ignores the abnormality.

As shown in FIG. 6, profiles 602 has three days of raw LIDAR data for LIDAR devices 601A-601K corresponding to ADVs 101A-101K. Here, LIDAR device 601A can be mounted on ADV 101A, LIDAR device 601B can be mounted on ADV 101B, and so forth. Regarding LIDAR device 601A, server 103 observes two separate data frames with abnormality indications 603 (e.g., missing a small section of data) on Aug. 8, 2022 and Aug. 10, 2022. The abnormality identification and categorization can be performed by detection module 125 of server 103 by applying one or more scanning models/algorithms to the raw LIDAR data. In this case, type 1 abnormality has a severity threshold of two or more occurrences within a span of three days. Since abnormality 603 occurred twice within three days, indication 603 on August 10 is marked as severe and server 103 can send an early warning signal to ADV 101A to warn an operator of ADV 101A to inspect LIDAR device 601A. The warning signal can be an instruction to play a visual indicator or an audible chime at a user interface of ADV 101A.

Referring to FIG. 6, LIDAR device 601B has type 2 abnormality (e.g., missing a large section of data) on Aug. 9, 2022. In this case, the type 2 abnormality severity threshold is one occurrence. When the type 2 abnormality is determined and the severity threshold is met, server 103 sends an early warning signal to ADV 101B to warn an operator to inspect LIDAR device 601B of potential hardware malfunctions.

Referring to FIG. 6, LIDAR devices 601A-601B, 601E-601G, and 601I have abnormality indications 611 observed at approximately a same time on Aug. 10, 2022. Since indications 611 is observed at a same time for two or more ADVs, server 103 can categorize indications 611 as systematic (e.g., weather related). In some embodiments, server 103 conditions the systematic indications on a location of the corresponding ADVs. E.g., if the ADVs are located less than a threshold distance (e.g., 10 km) from one another, indications for the LIDAR devices of these ADVs occurring at a same time are systematic. In some embodiments, server 103 conditions the systematic indications on a weather pattern (e.g., rain, fog, snow, etc.) at the driving locations of the corresponding ADVs.

Further, LIDAR device 601D has no available LIDAR data for processing. LIDAR device 601K has available data but are yet to be processed. Other LIDAR devices 601C, 601E-J have processed signals without any abnormalities. Thus, no warning signals are sent to ADVs 101C, 101E-J.

In one embodiment, profiles 602 can be viewed by an operator at server 103 or via a client accessing server 103 for a manual identification of abnormalities. In one embodiment, profiles 602 can be generated by device abnormality detection module 125 of server 103 or can be generated by a device abnormality detection module, such as device abnormality detection module 308 at any of ADVs 101A-101K. Note that the examples severity thresholds of two occurrences within three days, and one occurrence are only illustrated for purpose of illustration, server 103 can be configured with any values for the severity thresholds corresponding to each type of abnormalities. Although, one LIDAR device is associated to one ADV as shown in FIG. 6, each ADV can be associated with more than one LIDAR devices.

FIGS. 7A-7E are examples of point cloud data abnormalities according to one embodiment. As shown in FIGS. 7A-7E, point cloud frames 700, 710, 720, 730, and 740 illustrate different types of abnormalities for a rotating LIDAR device with a 360 degrees field of view. For each of the point cloud frames, the ADV is located at center location 703.

Figure 7A:
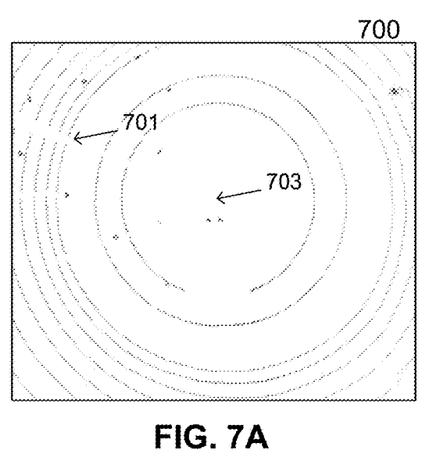
FIGS. 7A-7E are examples of point cloud data abnormalities according to some embodiments.
Figure 7B:
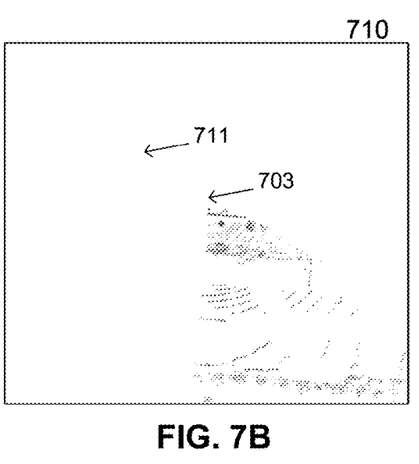
Figure 7C:
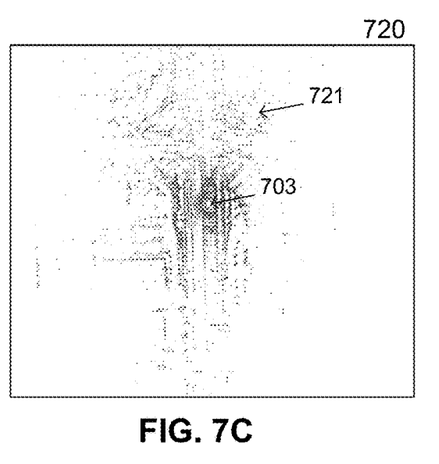
Figure 7D:
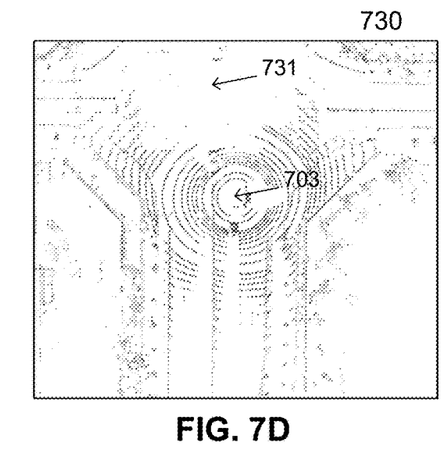
Figure 7E:
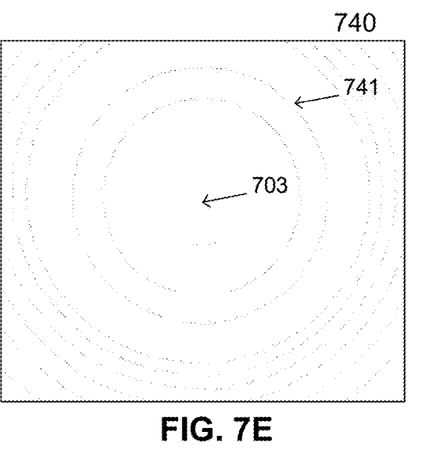

In one embodiment, frame 700 include an abnormality corresponding to a small section 701 that is missing. Here, the missing section is approximately 2 degrees in angle and reaches the most left edge of the point cloud data indicating an abnormality in the LIDAR data. In some cases, the missing angle abnormality can correspond to dirt or bird droppings on the LIDAR device. In some cases, the missing angle can correspond to issues at the processing circuit of the LIDAR device. In some cases, missing data is caused by weather (e.g., raining, snowing, etc.).

Referring to frame 710, abnormality 711 can correspond to a large section of missing data. In one embodiment, large section of missing data has would-be missing data for an angle greater than 10 degrees, or more than ⅛ of data are missing in the frame 710. Referring to frame 720, another abnormality 721 can correspond to noisy data. For example, noisy data in LIDAR data can result in indiscernible LIDAR scan lines. Referring to frame 730, another abnormality 731 can correspond to a large portion of missing data for a ground plane where the ADV expects to observe a road surface at the ground plane of the ADV. Referring to frame 740, another abnormality 741 can correspond to discontinuity in point cloud data, e.g., discontinuous scan lines for a threshold (e.g., greater than 50%) of LIDAR scan lines in a frame. Causes for the discontinuous scan lines can be hardware malfunctions. Although only five types of abnormalities are shown for a rotating LIDAR device, server 103 can include algorithms 124 to detect other types of abnormalities. Further, the abnormalities detection can be associated with other types of ranging devices (e.g., flash LIDAR, time of flight (TOF), RADAR, etc.).

Figure 8:
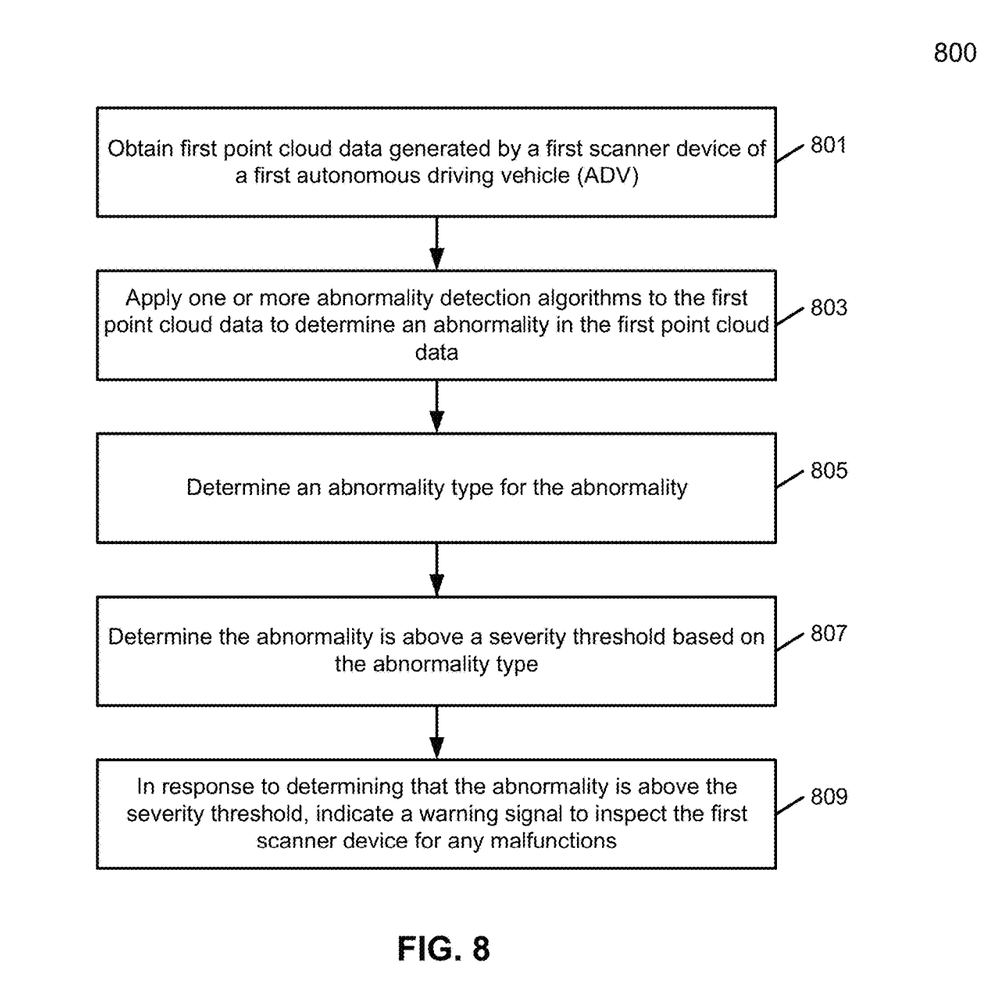

FIG. 8 is a flow diagram illustrating an example of a method to detect point cloud data abnormalities according to one embodiment. Process 800 may be performed by processing logic which may include software, hardware, or a combination thereof. For example, process 800 may be performed by device abnormality detection module 400 of FIG. 4.

At block 801, processing logic obtains first point cloud data generated by a first scanner device of a first autonomous driving vehicle (ADV).

At block 803, processing logic applies one or more abnormality detection algorithms 124 to the first point cloud data to determine an abnormality in the first point cloud data.

At block 805, processing logic determines an abnormality type for the abnormality.

At block 807, processing logic determines the abnormality is above a severity threshold based on the abnormality type.

In one embodiment, processing logic further determines the severity threshold based on the abnormality type. Different severity thresholds can be preconfigured for each type of abnormality and the configurations are stored at server 103.

At block 809, in response to determining that the abnormality is above the severity threshold, processing logic indicates a warning to inspect the first scanner device for any hardware malfunctions.

In one embodiment, processing logic obtains second point cloud data generated by a second scanner device of a second ADV. Processing logic applies one or more abnormality detection algorithms to the first and second point cloud data to determine one or more abnormalities in the first and second point cloud data. Processing logic determines the abnormalities appear among both the first and second point cloud data. In response to determining the abnormalities appear among both the first and second point cloud data, processing logic indicates the abnormalities correspond to a shared event.

For example, if the abnormalities are systematic (e.g., weather related), the abnormalities are ignored.

In one embodiment, the first point cloud data is uploaded to a cloud server node and the point cloud data is analyzed by the cloud server node.

In one embodiment, the abnormality type is one of a plurality of abnormality types and the plurality of abnormality types include: missing data for a small section of point cloud data, missing data for a large section of point cloud data, noisy point cloud data, or discontinuity in point cloud data.

In one embodiment, the scanner device includes a light detecting and ranging (LIDAR) device and the LIDAR device is a rotating or a flash LIDAR device.

In one embodiment, processing logic further obtain the first point cloud data generated by the first scanner device over a predetermined period of time, and where determining the abnormality is above the severity threshold includes determining the abnormality increased in severity over the predetermined period of time.

In one embodiment, processing logic provides a user interface to an operator to inspect point cloud data corresponding to one or more ADVs over a predetermined period of time.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method, comprising:
   receiving, by a processor, first point cloud data generated by a first scanner device of a first autonomous driving vehicle (ADV);
   applying one or more abnormality detection algorithms to the first point cloud data to determine an abnormality in the first point cloud data;
   determining an abnormality type for the abnormality;
   determining the abnormality is above a severity threshold based on the abnormality type;
   in response to determining that the abnormality is above the severity threshold, transmitting, by the processor, a warning to inspect the first scanner device for any hardware malfunctions; and
   transmitting a signal to control operating the ADV.

2. The method of claim 1, further comprising:
   receiving second point cloud data generated by a second scanner device of a second ADV;
   applying one or more abnormality detection algorithms to the first and second point cloud data to determine one or more abnormalities in the first and second point cloud data;
   determining the abnormalities appear among both the first and second point cloud data; and
   in response to determining the abnormalities appear among both the first and second point cloud data, transmitting the abnormalities correspond to a shared event.

3. The method of claim 1, wherein the first point cloud data is uploaded to a cloud server node and the first point cloud data is analyzed by the cloud server node.

4. The method of claim 1, wherein the abnormality type is one of a plurality of abnormality types and the plurality of abnormality types comprise: missing data for a small section of point cloud data, missing data for a large section of point cloud data, noisy point cloud data, or discontinuity in point cloud data.

5. The method of claim 1, wherein the first scanner device includes a light detecting and ranging (LIDAR) device and the LIDAR device is a rotating or a flash LIDAR device.

6. The method of claim 1, wherein the receiving, by the processor, the first point cloud data generated by the first scanner device comprises: receiving the first point cloud data generated by the first scanner device over a predetermined period of time, and wherein the determining the abnormality is above the severity threshold comprises; determining the abnormality increased in severity over the predetermined period of time.

7. The method of claim 1, further comprising: providing a user interface to an operator to inspect point cloud data corresponding to one or more ADVs over a predetermined period of time.

8. A non-transitory machine-readable medium having instructions stored therein, which when executed by a processor, cause the processor to perform operations, the operations comprising:
   receiving first point cloud data generated by a first scanner device of a first autonomous driving vehicle (ADV);
   applying one or more abnormality detection algorithms to the first point cloud data to determine an abnormality in the first point cloud data;
   determining an abnormality type for the abnormality;
   determining the abnormality is above a severity threshold based on the abnormality type;
   in response to determining that the abnormality is above the severity threshold, transmitting a warning to inspect the first scanner device for any hardware malfunctions; and
   transmitting a signal to control operating the ADV.

9. The non-transitory machine-readable medium of claim 8, wherein the operations comprise:
   receiving second point cloud data generated by a second scanner device of a second ADV;
   applying one or more abnormality detection algorithms to the first and second point cloud data to determine one or more abnormalities in the first and second point cloud data;
   determining the abnormalities appear among both the first and second point cloud data; and
   in response to determining the abnormalities appear among both the first and second point cloud data, transmitting the abnormalities correspond to a shared event.

10. The non-transitory machine-readable medium of claim 8, wherein the first point cloud data is uploaded to a cloud server node and the first point cloud data is analyzed by the cloud server node.

11. The non-transitory machine-readable medium of claim 8, wherein the abnormality type is one of a plurality of abnormality types and the plurality of abnormality types comprise: missing data for a small section of point cloud data, missing data for a large section of point cloud data, noisy point cloud data, or discontinuity in point cloud data.

12. The non-transitory machine-readable medium of claim 8, wherein the first scanner device includes a light detecting and ranging (LIDAR) device and the LIDAR device is a rotating or a flash LIDAR device.

13. The non-transitory machine-readable medium of claim 8, wherein the receiving the first point cloud data generated by the first scanner device comprises: receiving the first point cloud data generated by the first scanner device over a predetermined period of time, and wherein determining the abnormality is above the severity threshold comprises determining the abnormality increased in severity over the predetermined period of time.

14. The non-transitory machine-readable medium of claim 8, wherein the operations further comprise: providing a user interface to an operator to inspect point cloud data corresponding to one or more ADVs over a predetermined period of time.

15. A data processing system, comprising:
 a processor; and
 a memory coupled to the processor to store instructions, which when executed by the processor, cause the processor to perform operations, the operations including
 receiving first point cloud data generated by a first scanner device of a first autonomous driving vehicle (ADV);
 applying one or more abnormality detection algorithms to the first point cloud data to determine an abnormality in the first point cloud data;
 determining an abnormality type for the abnormality;
 determining the abnormality is above a severity threshold based on the abnormality type;
 in response to determining that the abnormality is above the severity threshold, transmitting a warning to inspect the first scanner device for any hardware malfunctions; and
 transmitting a signal to control operating the ADV.

16. The data processing system of claim 15, wherein the operations further comprise:
 receiving second point cloud data generated by a second scanner device of a second ADV;
 applying one or more abnormality detection algorithms to the first and second point cloud data to determine one or more abnormalities in the first and second point cloud data;
 determining the abnormalities appear among both the first and second point cloud data; and
 in response to determining the abnormalities appear among both the first and second point cloud data, transmitting the abnormalities correspond to a shared event.

17. The data processing system of claim 15, wherein the first point cloud data is uploaded to a cloud server node and the first point cloud data is analyzed by the cloud server node.

18. The data processing system of claim 15, wherein the abnormality type is one of a plurality of abnormality types and the plurality of abnormality types comprise: missing data for a small section of point cloud data, missing data for a large section of point cloud data, noisy point cloud data, or discontinuity in point cloud data.

19. The data processing system of claim 15, wherein the first scanner device includes a light detecting and ranging (LIDAR) device and the LIDAR device is a rotating or a flash LIDAR device.

20. The data processing system of claim 15, wherein the receiving the first point cloud data generated by the first scanner device comprises: receiving the first point cloud data generated by the first scanner device over a predetermined period of time, and wherein determining the abnormality is above the severity threshold comprises determining the abnormality increased in severity over the predetermined period of time.

* * * * *